Figure 1:
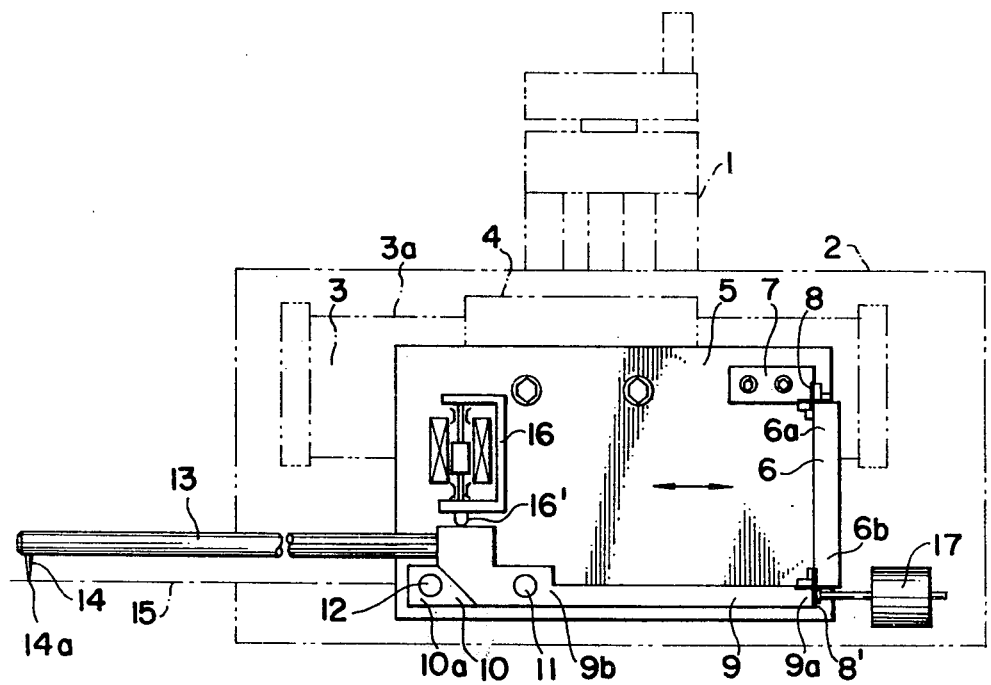

United States Patent [19]

Takeda

[11] 4,074,438
[45] Feb. 21, 1978

[54] PROFILE INDICATOR

[75] Inventor: Yasuo Takeda, Utsunomiya, Japan

[73] Assignee: Kabushiki Kaisha Mitutoyo Seisakusho, Tokyo, Japan

[21] Appl. No.: 663,518

[22] Filed: Mar. 3, 1976

[30] Foreign Application Priority Data

Mar. 19, 1975   Japan .................... 50-036878[U]

[51] Int. Cl.² ..................... G01B 5/20; G01B 7/28
[52] U.S. Cl. ..................... 33/174 P; 33/172 B; 33/172 E; 33/174 L
[58] Field of Search ............ 33/169 R, 169 F, 172 E, 33/172 B, 174 L, 174 P

[56] References Cited

U.S. PATENT DOCUMENTS

| | | | |
|---|---|---|---|
| 3,135,055 | 6/1964 | Butler et al. | 33/174 P |
| 3,245,148 | 4/1966 | Whitney | 33/174 L |
| 3,345,753 | 10/1967 | Giardino | 33/172 B |
| 3,785,056 | 1/1974 | Schiler | 33/174 L |
| 3,845,561 | 11/1974 | Elsdoerfer | 33/172 E |

Primary Examiner—Richard E. Aegerter
Assistant Examiner—Richard R. Stearns
Attorney, Agent, or Firm—Brisebois & Kruger

[57] ABSTRACT

Profile indicator in which by displacing an arm, a stylus attached to one end of the arm follows the contour of a surface to be measured, characterized in that said stylus attached to the arm is linearly displaced to the surface to be measured with use of a link mechanism to trace said surface.

2 Claims, 2 Drawing Figures

PROFILE INDICATOR

BACKGROUND OF THE INVENTION

The present invention relates to a profile indicator which measures the contour of an object with use of its stylus which traces the external surface of the object.

In the conventional profile indicator one end of a stylus-fitted arm is pivoted swingably to a movable frame and with a linear displacement of said movable frame the stylus traces the external surface of an object to be measured, whereby the profile of said object can be obtained by detecting the vertical displacement of the stylus depending on the contour of the external surface of the object.

Since the stylus is elevated with the arm pivot as the center, the stylus moves in an arc and therefore is it impossible to make an exact measurement of the profile of the object using the stylus.

The present invention, aimed at elimination of the above drawback of the conventional device, is characterized in that with use of a link mechanism a linear movement of the stylus when the arm swings is assured.

SUMMARY OF THE INVENTION

The first object of the present invention is to provide a profile indicator in which the stylus reliably makes a linear movement with use of three link bars when the arm swings.

The second object of the present invention is to provide a profile indicator in which three link bars are arranged on a plane parallel to the movable plane of a slide plate and said three link bars can be swung within said parallel plane.

The third object of the present invention is to provide a profile indicator in which the bases of the first link bar and the third link bar are respectively pivoted to a slide plate; the tips of these link bars are pivoted to the second link bar; and the second link bar is fitted with a stylus-equipped arm.

Figure 2:
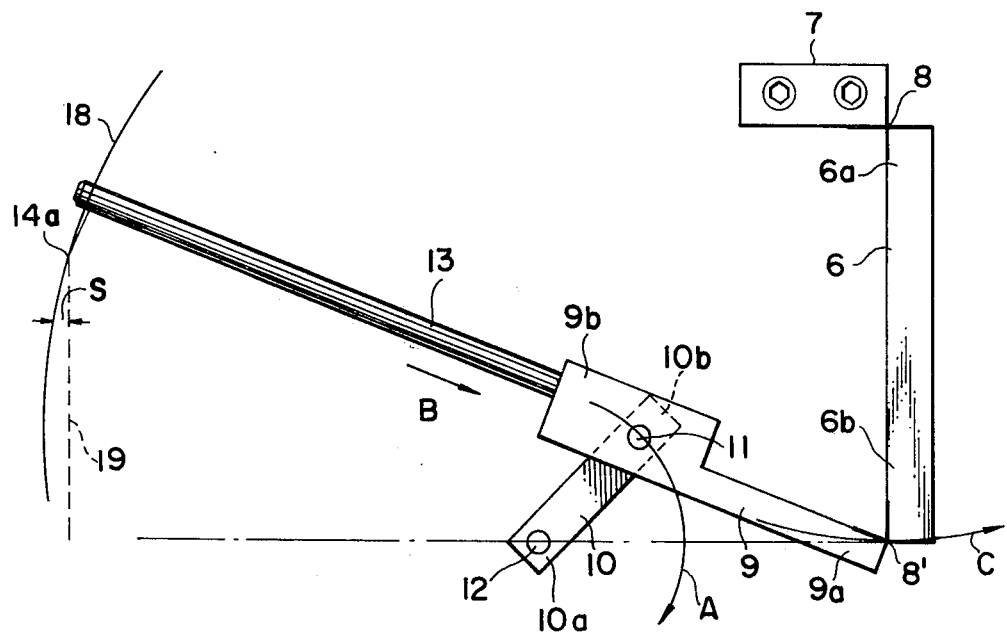

Several other objects of the present invention will become apparent from the following detailed account of a specific example and from the attached drawings, in which:

FIG. 1 is a diagram illustrating an embodiment of the present invention and FIG. 2 shows the major part of the embodiment in FIG. 1.

In FIGS. 1 and 2, a frame 2 is supported on a prop 1; a horizontally maintained reference plate 3 is set within said frame 2; and slider 4 is supported on said reference plate 3 slidably in its longitudinal direction. A slide plate 5 is integrally fitted to said slider 4 and said slide plate 5 is moved along the reference plane 3a of said reference plate 3.

The first link bar 6 is set within a plane parallel to the movable plane of said slide plate 5; the base 6a of said first link bar 6 is pivoted by means of the first cruciform spring 8 (first pivot) to the fixed body 7 of said slide plate 5; and said first link bar 6 is fitted swingably along a plane parallel to the movable plane of the slide plate 5. The second link bar 9 is set within a plane in which the first link bar 6 swings; the base 9a of said second link bar 9 is pivoted by means of the second cruciform spring 8' (second pivot) to the tip 6b of said first link bar 6; and said second link bar 9 is fitted swingably along the plane in which the first link bar 6 swings. Further the third link bar 10 is set within a plane in which the first link bar 6 swings; the base 10a of said third link bar 10 is pivoted with a bearing 12 (third pivot) swingably to said slide plate 5; said third link bar 10 is fitted swingably along the plane in which the first link bar 6 swings; and the tip 10b of the third link bar 10 is connected with a bearing 11 (fourth pivot) swingably to the tip 9b of said second link bar 9.

An arm 13 is attached to the tip 9b of said second link bar 9; a stylus 14 is attached to the end of said arm 13; and the tip 14a of said stylus 14 is located on a line 15 which connects the second cruciform spring 8 and the bearings 11, 12.

Meanwhile said slide plate 5 is equipped with a differential transformer 16, the plunger 16' of which bears against said second link bar 9. In the figure, 17 denotes a weight attached to the second link bar 9.

The performance of a profile indicator according to the present invention is to be described.

When the slide plate is moved to cause the stylus 14 to follow the measured surface, the stylus rises or falls depending on the profile of the measured surface. Here is to be explained how the stylus 14 makes a linear movement in the vertical direction. In FIG. 2, whe the stylus 14 falls, the third link bar 10 swings around the bearing 12 in the direction of arrow A. Thereby the tip 14a of the stylus 14 tends to draw an arc 18, but the third link bar 10 forces the arm 13 to move in the direction of arrow B. Meanwhile, the first link bar 6 swings in the direction of arrow C around the cruciform spring 8. Therefore if the length ratio among the first link bar 6, the second link bar 9 and the third link bar 10 is preset, the deviation S will be absorbed and the tip 14a of the stylus 14 will move along a straight line 19. When the stylus 14 rises, the process will be reverse to the above and the tip 14a of the stylus 14 will also move along the straight line 19. Thus the displacement of the stylus 14 can be detected by the differential transformer 16 and can be registered on the recording paper.

As described above, according to the present invention a link mechanism assures a linear movement of the stylus and therefore the profile of an object can be accurately measured.

In the embodiment illustrated in FIGS. 1 and 2, the cruciform springs 8,8' are used to connect the first link bar 6 with the fixed body and to connect the first link bar with the second link bar, but pins and the like may be used instead of the springs.

What is claimed is:

1. In a profile indicator for measuring the contour of a surface, said indicator comprising a slide plate, an arm carried by the slide plate, and a stylus attached to one end of the arm, the improvement which comprises a first link bar having a first pivot and a second pivot spaced from the first pivot, said first link being pivotally connected at said first pivot to said slide plate for swinging movement in a plane parallel to said slide plate, a third link bar having a third pivot and a fourth pivot and pivotally connected to said slide plate at said third pivot for swinging movement in a plane parallel to said slide plate, a second link bar having one end pivotally connected to said first link bar at said second pivot, and pivotally connected to said third link bar at said fourth pivot at the point on the second link bar which is spaced from said second pivot, said arm with the stylus being fixed to said second link bar, said first, second, third and fourth pivots, said first, second and third members, and said arm being positioned and configured such that swinging movement of said second link bar results in a compensating swinging movement of said first link bar to cause the tip of the stylus to move in a straight line.

2. Profile indicator as claimed in claim 1 comprising a differential transformer transducer fixedly connected to said slide plate, having a movable member bearing against said second link bar.

* * * * *